Jan. 1, 1963 J. GRANT 3,071,647
INTERCOMMUNICATION SYSTEM
Filed Jan. 7, 1959
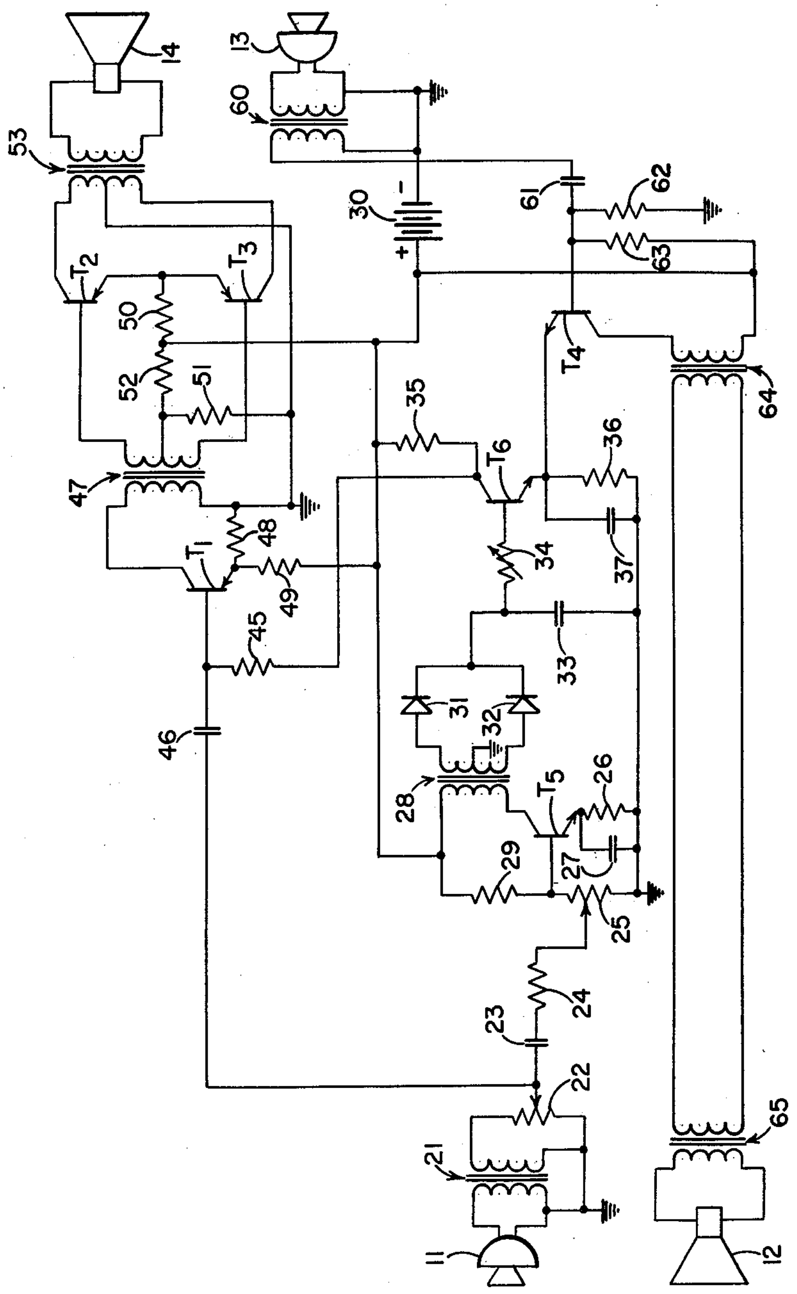
INVENTOR.
JOHN GRANT
BY Elmer J. Nealon
ATTORNEY.

United States Patent Office 3,071,647

Patented Jan. 1, 1963

3,071,647

INTERCOMMUNICATION SYSTEM

John Grant, West Peabody, Mass., assignor, by mesne assignments, to Sylvania Electric Products Inc., Wilmington, Del., a corporation of Delaware Filed Jan. 7, 1959, Ser. No. 785,491
6 Claims. (Cl. 179—1)

This invention relates to intercommunication systems, and more particularly to two-way intercommunication systems wherein the signal transmission channels are automatically controlled from one station.

Intercommunication systems in which two or more stations are interconnected to provide two-way voice communication over wires are well known. In apparatus for two-way communication it is frequently desirable to provide means for permitting transmission in only one direction at a time and thus to eliminate problems of feedback and cross-talk. Control of the channels of transmission to permit transmission in one direction and prevent it in the other direction is a function which in many applications may best be handled from only one particular master or control station. Although manual controls for this purpose are known, it is often desirable that such control be exercised automatically.

It is therefore an object of the invention to provide improved apparatus for the transmission of signals between two stations.

It is a more specific object of the invention to provide improved two-way intercommunication apparatus wherein the transmission channels are controlled automatically from one station.

Briefly, in accordance with the invention two signal transmission channels of an intercommunication system are each provided with a switching means for permitting transmission through the first channel and preventing transmission through the second channel while a signal is applied to the first transmission channel, and for permitting transmission through the second channel while there is no signal applied to the first transmission channel.

It is a feature of the invention to provide a switching circuit having one of the transistors of a complementary pair in each of the two transmission channels to serve as the respective switching means. During application of a signal to the first channel the transistor in the first channel is biased to its conducting state for permitting conduction in that channel and the transistor in the second channel is biased to its cut-off state for preventing conduction in that channel. The biasing conditions on the pair of complementary transistors are reversed during the absence of a signal at the input of the first signal transmission channel.

It is another feature of the invention to provide a switch control circuit for controlling the bias applied to each of the transistors of the complementary pair. Separate outputs for supplying the biases are taken from two of the electrodes of a transistor in the switch control circuit. One output is applied to the switching transistor in the first signal transmission channel and the other output is applied to the complementary switching transistor in the second signal transmission channel. The output signals supplied by the switch control circuit depend on the conduction state of the switch control transistor which state is controlled, in turn, by the presence or absence of a signal at the input of the first signal transmission channel.

Additional objects, features, and advantages of the invention will be apparent from the following detailed discussion and the accompanying drawing. The single FIGURE of the drawing is a schematic circuit diagram of intercommunication apparatus illustrative of the invention.

In the drawing, a master station having a microphone 11 and a speaker 12 is connected for two-way voice communication to a single sub-station having a microphone 13 and a speaker 14. The master station microphone is connected to the substation speaker through a first signal transmission channel. A first switching circuit including a first switching transistor $T_1$ is connected in series in the first transmission channel. This channel also includes a push-pull amplifier utilizing two transistors $T_2$ and $T_3$ for driving the substation speaker 14. The microphone 13 of the sub-station is connected to the speaker 12 of the master station through a second signal transmission channel. A second switching circuit including a second switching transistor $T_4$ is connected in series in the second channel. The first switching transistor $T_1$ and the second switching transistor $T_4$ form a complementary pair. That is, the two transistors are of opposite conductivity types. The master station microphone 11 is also connected to a switch control circuit including an amplifier section having a transistor $T_5$. The output of the transistor $T_5$ is detected, and the results applied to a switch control transistor $T_6$ to place it in the low conduction state or in the high conduction state. Outputs from the switch control transistor $T_6$ provide for biasing the two switching transistors $T_1$ and $T_4$ so that one is biased to cut-off while the other is biased in its conducting state, and for reversing the operating states of these transistors as the state of the switch control transistor $T_6$ is changed.

The master station microphone 11 is connected across one winding of a coupling transformer 21, and a volume control potentiometer 22 is connected across the other winding of the transformer. Coupling into the amplifier section of the switch control circuit from the movable center contact of the potentiometer 22 is provided through a capacitance 23 and a resistance 24 connected to the movable center contact of another potentiometer 25. Potentiometer 25 is connected between ground and the base of the N-P-N amplifier transistor $T_5$. The emitter of the transistor $T_5$ is connected to ground through an emitter biasing resistance 26 in parallel with a capacitance 27. The collector of the transistor is connected to the base through one winding of a transformer 28 and a resistance 29. A D.C. voltage source or battery 30 is connected with its positive terminal to the connection between the transformer winding and resistance and with its negative terminal to ground. Two diodes 31 and 32 are connected across the second winding of the transformer 28 which is center-tapped to ground forming a full-wave rectifier for the output of the amplifier transistor $T_5$. A capacitor 33 is connected to the two diodes and to ground to form with the diodes a detector circuit. The output of the detector circuit is applied to the base of the N-P-N switch control transistor $T_6$ through a variable resistance 34. Positive potential is applied to the collector of the transistor $T_6$ through a resistance 35 connected to the D.C. source 30. The emitter of the transistor is connected to ground through a resistance 36 in parallel with a capacitance 37. An output connection is taken directly from the emitter of the transistor $T_6$ to the emitter of the N-P-N transistor $T_4$ in the switching circuit of the second signal transmission channel. Another output connection is taken from the collector of the transistor $T_6$ through a resistance 45 to the base of the P-N-P transistor $T_1$ in the switching circuit of the first signal transmission channel.

In the first signal transmission channel the output of the master station microphone 11 is taken from the movable center contact of the potentiometer 22 and applied through a capacitance 46 to the base of the P-N-P transistor $T_1$ of the first switching circuit. The emitter of the switching transistor $T_1$ is connected to ground through a resistance 48, and to the positive terminal of the battery 30 through another resistance 49. One winding of a coupling transformer 47 is connected between the collector of transistor $T_1$ and ground. The other winding of the transformer is connected between the bases of a pair of P-N-P transistors $T_2$ and $T_3$ arranged to provide a push-pull amplifier. The emitters of the transistors $T_2$ and $T_3$ are connected together through a resistance 50 to the positive terminal of the battery 30. A center tap from the second winding of the transformer 47 is connected through a resistance 51 to ground and through a resistance 52 to the positive terminal of the battery. The output is taken from the push-pull amplifier through a coupling transformer 53 having a first winding connected between the collectors of the transistor and a second winding connected across the sub-station speaker 14. A center tap from the first winding of the transformer 53 is connected to ground.

In the second signal transmission channel the sub-station microphone 13 is connected across the first winding of a coupling transformer 60. One terminal of the second transformer winding is grounded and the other is connected through a capacitance 61 to the base of the N-P-N transistor $T_4$ in the second switching circuit. A shunt resistor 62 is connected between the base of the switching transistor $T_4$ and ground. The collector of the transistor $T_4$ is connected to the base through the first winding of a coupling transformer 64 and a resistance 63. The connection between the transformer winding and the resistance 63 is connected to the positive terminal of the battery 30. The output of the transformer 64 is transmitted through a two-wire line and coupled through another transformer 65 to the master station speaker 12, thus completing the second signal transmission channel.

Under operating conditions with voltage applied to the circuit but with no signal applied by way of the master station microphone 11, there is no output from the switch control amplifier transistor $T_5$. The base of switch control transistor $T_6$ is, therefore, near ground potential and the transistor is biased in the off or low conduction condition. There is no appreciable current flow through either the collector or the emitter circuit of the transistor $T_6$. The base of the first switching transistor $T_1$ is thus biased positively at a potential near that of the battery 30, and the emitter of the second switching transistor $T_4$ is biased near ground potential. The bias on the base of the first switching transistor $T_1$ is more positive than that on the emitter, which bias is determined by the voltage divider consisting of resistances 49 and 48, and the transistor is cut-off. The base of the second switching transistor $T_4$ is biased positively with respect to the emitter by the voltage resulting from the voltage divider consisting of resistances 63 and 62. This transistor is thus biased for operation as an amplifier, and input signals at the sub-station microphone 13 will be transmitted through the second signal transmission channel to the master station speaker 12.

When an input signal is applied to the first signal transmission channel by way of the master station microphone 11, it is amplified by the switch control amplifier transistor $T_5$. The amplified signal is coupled to the full wave rectifier formed by the two diodes 31 and 32 through the coupling transformer 28. The full wave rectifier in combination with the capacitance 33 provides a detecting circuit, and when a signal is applied to the rectifiers, a voltage occurs across the capacitance 33. This voltage causes the base of the switch control transistor $T_6$ to be biased positively and the transistor is thus triggered to the on or high conduction condition. The level of input signal required in order to obtain triggering on of the switch control transistor $T_6$ is regulated by the setting of the potentiometer 25 in combination with the volume setting of potentiometer 22. The rapidity with which triggering occurs, both on and off, is regulated by the time constant of the capacitance 33 and the variable resistance 34. With the switch control circuit activated, current flows through the resistance 36 in the emitter circuit causing the potential at the emitter to increase. As a result, the emitter potential of the second switching transistor $T_4$ is also increased, biasing that transistor to cut-off and preventing transmission through the second signal transmission channel despite the presence or lack of a signal in the channel. Current flow through the resistance 35 in the collector circuit of the switch control transistor $T_6$ causes the potential on the base of the first switching transistor $T_1$ to decrease so that the transistor $T_1$ is no longer biased to cut-off. After this change in bias occurs, the first switching transistor $T_1$ operates as an amplifier permitting the transmission of signals from the master station microphone 11 through the first signal transmission line to the push-pull amplifier driving the sub-station speaker 14. Thus, while a signal is applied at the input of the first signal transmission channel, transmission through that channel is automatically permitted and transmission through the second signal transmission channel is automatically prevented. While there is no signal being applied to the first transmission channel, transmission is automatically permitted through the second signal transmission channel.

In a typical example of a useful specific embodiment, the invention may be employed using a standard telephone handset as the master station. The microphone 11 and speaker 12 each have an impedance of 600 ohms. The sub-station includes a microphone 13 and speaker 14 each having an impedance of 3.2 ohms. The types or values of the other circuit components are as follows:

| | |
|---|---|
| Transistor $T_1$ | Sylvania Type 2N307 P-N-P. |
| Transistor $T_2$ | Sylvania Type 2N307 P-N-P. |
| Transistor $T_3$ | Sylvania Type 2N307 P-N-P. |
| Transistor $T_4$ | Sylvania Type 2N35 N-P-N. |
| Transistor $T_5$ | Sylvania Type 2N35 N-P-N. |
| Transistor $T_6$ | Sylvania Type 2N35 N-P-N. |
| Diode **31** | Sylvania Type 1N34A. |
| Diode **32** | Sylvania Type 1N34A. |
| D.C. voltage source **30** | 15 volts. |
| Resistor **24** | 3,000 ohms. |
| Resistor **26** | 470 ohms. |
| Resistor **29** | 60,000 ohms. |
| Resistor **35** | 3,000 ohms. |
| Resistor **36** | 1,000 ohms. |
| Resistor **45** | 22,000 ohms. |
| Resistor **48** | 200 ohms. |
| Resistor **49** | 50 ohms |
| Resistor **50** | 1 ohm. |
| Resistor **51** | 5,000 ohms. |
| Resistor **52** | 100 ohms. |
| Resistor **62** | 5,000 ohms. |
| Resistor **63** | 60,000 ohms. |
| Variable resistor **34** | 0 to 50 ohms. |
| Potentiometer **22** | 0 to 2,000 ohms. |
| Potentiometer **25** | 0 to 5,000 ohms. |
| Capacitor **23** | 10 microfarads. |
| Capacitor **27** | 50 microfarads. |
| Capacitor **33** | 10 microfarads. |
| Capacitor **37** | 50 microfarads. |
| Capacitor **46** | 10 microfarads. |
| Capacitor **61** | 10 microfarads. |
| Transformer **21** | 600 ohms to microphone **11**; 1,000 ohms to transistors $T_1$ and $T_5$. |
| Transformer **28** | 20,000 ohms to transistor $T_5$; 1,000 ohms to transistor $T_6$. |
| Transformer **47** | 10,000 ohms to transistor $T_1$; 2,000 ohms to transistors $T_2$ and $T_3$. |
| Transformer **53** | 125 ohms to transistors $T_2$ and $T_3$; 3.2 ohms to speaker **14**. |
| Transformer **60** | 3.2 ohms to microphone **13**; 1,000 ohms to transistor $T_4$. |
| Transformer **64** | 10,000 ohms to transistor $T_4$; 600 ohms to line. |
| Transformer **65** | 600 ohms to line; 600 ohms to speaker **12**. |

As described hereinabove, in intercommunication systems employing apparatus according to the invention, two-way transmission is provided with control of the transmission channels obtained automatically from one station. The use of complementary transistors in the switching circuits makes it possible to use two separate output connections from the switch control circuit for controlling the biases on the switching transistors. Outputs from two different electrodes of one switch control transistor are thus able to provide sufficient difference in potentials to permit alternate biasing of the two switching transistors in both cut-off and normal operating conditions with no intervening stages required. The particular types of transistors employed in the switching circuits and in the switch control circuit may be either N-P-N or P-N-P without departing from the teachings of the invention provided that the two switching transistors form a complementary pair.

Although the invention has been shown and described for an intercommunication system having one master station and one sub-station, the number of either or both may be increased. With suitably employed station selector switches two-way communication can be obtained between any master station and any number of sub-stations in a network. In accordance with the teachings of the invention, the switching transistor in the transmission channel from a master station microphone to a sub-station speaker will be the complement of the switching transistor in the transmission channel from the sub-station microphone to the master station speaker.

What is claimed is:

1. Signal transmission apparatus including in combination a first signal transmission channel, a second signal transmission channel, a first switching means including a first transistor of one type in said first transmission channel, a second switching means including a second transistor of the type complementary to said first transistor in said second transmission channel, and switch control means connected to said first signal transmission channel and to said first and said second switching means for biasing said first transistor to permit signal transmission therethrough and said second transistor to prevent signal transmission therethrough while a signal is applied to said first signal transmission channel and for biasing said second transistor to permit signal transmission therethrough while no signal is applied to said first signal transmission channel.

2. Signal transmission apparatus including in combination a first signal transmission channel, a second signal transmission channel, a first switching circuit including a first transistor of one type in said first transmission channel, a second switching circuit including a second transistor of the type complementary to said first transistor in said second transmission channel, and switch control means connected to said first signal transmission channel and having a first output connection to said first transistor and a second output connection to said second transistor for biasing said first transistor to its conducting state and said second transistor to its cut-off state while a signal is applied to said first signal transmission channel and for biasing said first transistor to its cut-off state and said second transistor to its conducting state while no signal is applied to said first signal transmission channel.

3. Signal transmission apparatus including in combination a first signal transmission channel, a second signal transmission channel, a first switching circuit including a first transistor of one type in said first transmission channel, a second switching circuit including a second transistor of the type complementary to said first transistor in said second transmission channel, switch control means, an input connection from said first signal transmission channel to said switch control means for activating said switch control means only while a signal is applied to said first signal transmission channel, a first output connection from said switch control means to said first transistor for biasing said first transistor to its conducting state while said switch control means is activated and for biasing said first transistor to its cut-off state while said switch control means is not activated, and a second output connection from said switch control means to said second transistor for biasing said second transistor to its cut-off state while said switch control means is activated and for biasing said second transistor to its conducting state while said switch control means is not activated.

4. Signal transmission apparatus including in combination a first signal transmission channel having an input thereto, a second signal transmission channel, a first switching circuit including a first transistor of one type connected in series in said first transmission channel, a second switching circuit including a second transistor of the type complementary to said first transistor connected in series in said second transmission channel, a switch control circuit including a switch control transistor, an input connection from the input to said first signal transmission channel to a first electrode of said switch control transistor for causing said switch control transistor to operate in the high conduction state only while a signal is applied at the input to said first signal transmission channel, a first output connection from a second electrode of said switch control transistor to said first transistor for biasing said first transistor to its conducting state while said switch control transistor is in the high conduction state and for biasing said first transistor to its cut-off state while said switch control transistor is not in the high conduction state, and a second output connection from a third electrode of said switch control transistor to said second transistor for biasing said second transistor to its cut-off state while said switch control transistor is in the high conduction state and for biasing said second transistor to its conducting state while said switch control transistor is not in the high conduction state.

5. Signal transmission apparatus including in combination a first signal transmission channel connecting a first microphone to a first speaker, a second signal transmission channel connecting a second microphone to a second speaker, a first switching circuit including a first transistor of one type connected in series in said first transmission channel, a second switching circuit including a second transistor of the type complementary to said first transistor connected in series in said second transmission channel, a switch control circuit including a switch control transistor, an input circuit connecting said first microphone to a first electrode of said switch control transistor, said input circuit including a detector circuit for biasing said switch control transistor to the high conduction state only while a signal is applied at said first microphone, a first output connection from a second electrode of said switch control transistor to an electrode of said first transistor for biasing said first transistor to its conducting state while said switch control transistor is in the high conduction state and for biasing said first transistor to its cut-off state while said switch control transistor is not in the high conduction state, and a second output connection from a third electrode of said switch control transistor to an electrode of said second transistor for biasing said second transistor to its cut-off state while said switch control transistor is in the high conduction state and for biasing said second transistor to its conducting state while said switch control transistor is not in the high conduction state.

6. An intercommunicating system for providing two-way communication between a master station and a sub-station, wherein transmission from the master station to the sub-station is automatically permitted and transmission from the sub-station to the master station is automatically prevented while a signal is applied to the master station microphone, and wherein transmission from the sub-station to the master station is automatically permitted while there is no signal applied to the master station microphone; said system including in combination a master station microphone; a sub-station speaker; a first switching circuit including a P-N-P switching transistor having its base coupled to said master station microphone and having a collector circuit coupled to said sub-station speaker; a sub-station microphone; a master station speaker; a second switching circuit including an N-P-N switching transistor having its base coupled to said sub-station microphone and having a collector circuit coupled to said master station speaker; a switch control circuit including an amplifier, a detector circuit, and an N-P-N switch control transistor; an input circuit to said amplifier from said master station microphone; said detector circuit being coupled to the output of said amplifier and being connected to the base of said switch control transistor for biasing said switch control transistor to the high conduction state only while a signal is applied at said master station microphone; a first output connection from the collector of said switch control transistor to the base of said P-N-P switching transistor for biasing said P-N-P switching transistor to its conducting state while said switch control transistor is in the high conduction state and for biasing said P-N-P switching transistor to its cut-off state while said switch control transistor is not in the high conduction state; and a second output connection from the emitter of said switch control transistor to the emitter of said N-P-N switching transistor for biasing said N-P-N switching transistor to its cut-off state while said switch control transistor is in the high conduction state and for biasing said switch control transistor to its conducting state while said switch control transistor is not in the high conduction state.

References Cited in the file of this patent

UNITED STATES PATENTS

| | | |
|---|---|---|
| 2,691,073 | Lowman | Oct. 5, 1954 |
| 2,702,319 | Ryall | Feb. 15, 1955 |
| 2,810,081 | Elliott | Oct. 15, 1957 |
| 2,904,641 | Radcliffe | Sept. 15, 1959 |
| 2,966,979 | Zarling | Jan. 3, 1961 |